United States Patent

Onishi et al.

Patent Number: 5,431,894
Date of Patent: Jul. 11, 1995

[54] PREVENTION OF AMMONIA DECOMPOSITION

[75] Inventors: Toshiyuki Onishi; Shozo Kaneko; Satoru Serizawa; Toshihiko Imamoto; Atsushi Morii; Osamu Naito, all of Nagasaki, Japan

[73] Assignee: Mitsubishi Jukogyo Kabushiki Kaisha, Tokyo, Japan

[21] Appl. No.: 105,739

[22] Filed: Aug. 12, 1993

[30] Foreign Application Priority Data

Aug. 18, 1992 [JP] Japan .................. 4-219105
Jul. 26, 1993 [JP] Japan .................. 5-183704

[51] Int. Cl.⁶ .............................. C01B 21/04
[52] U.S. Cl. ...................... 423/239.1; 423/235
[58] Field of Search ........ 423/212, 210, 235, 239.1, 423/237; 239/400

[56] References Cited

U.S. PATENT DOCUMENTS 4,423,017 12/1983 Dean ........................ 423/235
4,797,329  1/1989 Kilbane et al. ............. 428/623
5,237,939  8/1993 Spokoyny et al. ............ 423/235

OTHER PUBLICATIONS

Berkman, et al, Catalysis: Inorganic and Organic, 1940, p. 765. (no month).

Primary Examiner—Michael Lewis
Assistant Examiner—Thomas G. Dunn, Jr.
Attorney, Agent, or Firm—McAulay Fisher Nissen Goldberg & Kiel

[57] ABSTRACT

A method for denitrating an exhaust gas is disclosed which comprises the steps of injecting ammonia from an ammonia injection device into a high-temperature exhaust gas containing nitrogen oxides in a temperature range of 480° C. or more, and then bringing a mixture of ammonia and the high-temperature exhaust gas into contact with a denitration catalyst to reduce the mixture, said method being characterized in that ammonia is injected through the ammonia injection device in which at least an inner surface is subjected to an aluminizing treatment, whereby ammonia is prevented from decomposing; and an apparatus for denitrating an exhaust gas is also disclosed.

4 Claims, 2 Drawing Sheets

PREVENTION OF AMMONIA DECOMPOSITION

BACKGROUND OF THE INVENTION (i) Field of the Invention

The present invention relates to a method for preventing the decomposition of ammonia, and a device for injecting ammonia in which the decomposition of ammonia can be prevented. More specifically, it relates to a method and a device for preventing the decomposition of ammonia before ammonia has reached a denitration apparatus, when an exhaust gas is denitrated at high temperatures in the denitration apparatus using ammonia as a reducing agent.

(ii) Description of the Related Art

In a denitration apparatus utilizing selective contact reduction which is installed to treat an exhaust gas coming from a gas turbine or a diesel engine, a steel pipe made of soft iron has been used as a device for injecting a reducing gas, such as ammonia, for a mid-temperature denitration process in which the temperature of the exhaust gas is 400° C. or less. Also, in a high-temperature denitration process in which the temperature of the exhaust gas is 480° C. or more, a device for injecting ammonia as the reducing agent, such as an injection mother pipe, an injection nozzle or the like disposed in an exhaust gas duct, is heated by the exhaust gas, so that ammonia is heated up to high temperatures. In such a high-temperature denitration process, a steel pipe made of a chrome-molybdenum steel or a stainless steel is used in consideration of heat resistance, but ammonia is brought into contact with the iron component of the injection pipe and therefore ammonia tends to become oxidized and decomposed.

As a result of this decomposition of the ammonia gas, the actual amount of ammonia fed to the inlet to the denitration catalyst becomes reduced, and thus an excessive amount of ammonia beyond the amount required solely for denitration has to be supplied. In addition, the decomposition of the ammonia gas leads to the generation of nitrogen oxides (hereinafter abbreviated to "NO$_x$") and also gives rise to a reduced denitration efficiency.

As described above, in the case where the ammonia gas is injected into a high-temperature atmosphere at 480° C. more, the ammonia gas comes in contact with the inner surface of an injection pipe made of a chrome-molybdenum steel or a stainless steel or with a metal component of a nozzle structure and decomposes. Due to this decomposition of ammonia, NO$_x$ is produced. Therefore, when such a process is applied to an apparatus for a denitration reaction, the denitration efficiency deteriorates. In order to avoid this disadvantage, it is necessary to cover metal-gas contact portions exposed to the high-temperature atmosphere with a material which does not cause a reaction with the ammonia gas even in a high-temperature range. In addition, the apparatus for the denitration reaction must have a structure which has mechanical strength and can withstand thermal shocks at the high temperature.

SUMMARY OF THE INVENTION

An object of the present invention is, in view of the above-mentioned technical level and the above-mentioned problems, to provide a method and apparatus for preventing the decomposition of ammonia in a ammonia injection device, when an exhaust gas is denitrated under high-temperature conditions using ammonia as a reducing agent in a denitration apparatus.

The first aspect of the present invention is directed to a method for denitrating an exhaust gas while preventing decomposition of ammonia prior to denitration, which method comprises the steps of injecting ammonia from an ammonia injection device into a high-temperature exhaust gas which contains nitrogen oxides in a region where a temperature of the exhaust gas is 480° C. or more, and then bringing a mixture of ammonia and the high-temperature exhaust gas into contact with a denitration catalyst to reduce the nitrogen oxides, wherein ammonia is injected through the ammonia injection device, at least an inner surface of which has been subjected to an aluminizing treatment, thereby ammonia is prevented from decomposing.

The second aspect of the present invention is directed to the above-mentioned method for denitrating an exhaust gas wherein the ammonia injection device whose an inner surface of has been subjected to an aluminizing treatment is composed of a nozzle mother pipe and injection nozzles, or injection mother pipes, nozzle mother pipes and injection nozzles.

The third aspect of the present invention is directed to an apparatus for denitrating an exhaust gas which comprises an ammonia injection device for injecting ammonia into a high-temperature exhaust gas which contains nitrogen oxides in a region where the temperature of the exhaust gas is 480° C. or more, and a denitration catalyst which is disposed in a passage of the exhaust gas and which is brought into contact with a mixture of ammonia and the high-temperature exhaust gas to reduce the nitrogen oxides present in the mixture, wherein at least an inner surface of the ammonia injection device has been subjected to an aluminizing treatment.

The fourth aspect of the present invention is directed to the above-mentioned apparatus for denitrating an exhaust gas wherein the ammonia injection device is composed of a nozzle mother pipe and injection nozzles, or injection mother pipes, nozzle mother pipes and injection nozzles.

It has been found, in view of the above-mentioned problems, that aluminum is a metal which does not decompose ammonia very much at high temperatures, and the present invention has been completed on the basis of this knowledge. However, aluminum cannot be directly used as a pipe material because it lacks sufficient strength. Furthermore, a double pipe structure in which a steel pipe is provided on the outside as a protective pipe and an aluminum pipe is disposed inside the steel pipe can be considered, but in such a structure, it is necessary to take measures against differences in thermal expansion between the aluminum pipe and the protective steel pipe. Such a double pipe structure tends to become complicated.

According to the present invention, as a technique for preventing the decomposition of an ammonia gas with a simple structure, the inner surface of the steel pipe is aluminized by a surface treatment using aluminum. This surface treatment may be any of thermal spraying, an alumite treatment and a calorizing treatment, but from the viewpoints of durability at high temperatures and resistance to thermal shocks, the calorizing treatment is preferable. Also, the aluminizing treatment can be given not only to the inner surface of the steel pipe through which ammonia is introduced into the exhaust gas, but also to the outer surface of the steel pipe and the inner surface of an exhaust gas duct.

The calorizing treatment which can be employed as the aluminizing treatment of the present invention is a pack method using a penetrating agent which can be prepared by adding 1-2% or less of ammonium chloride to a powder obtained by melting an Fe—Al alloy. With this method, an Fe—Al alloy layer containing 25 to 30% of aluminum is formed on the surface of a base steel material. The thermal spraying technique used in the present invention is a method in which aluminum is melted and sprayed with compressed air and an ordinary heating gas as a heat source. In order to form an aluminum layer usable at high temperatures by thermal spraying, aluminum is melted and sprayed to a thickness of 0.3-0.4 mm, and then heated at 800°-850° C. for a period of 30-180 minutes in a reducing atmosphere in a heating furnace to diffuse aluminum into the base steel plate. Moreover, the alumite treatment is a process in which the steel material is dipped into a dissolved aluminum bath to form aluminum plating.

An ammonia gas is stably present in a high-temperature atmosphere at 800° C. or more if there exists neither a metal nor a metal oxide which comes in contact with the ammonia gas. However, if a certain kind of metal, for example, ferric oxide ($Fe_2O_3$) is present, the decomposition of ammonia begins at a temperature of about 400° C. In this connection, decomposition reactions of ammonia have been described in detail in Murakami et al., Journal of Japanese Chemical Society (Nihon Kagaku Kai Shi), Vol. 5, p. 612 (1977).

When the surface treatment is carried out using aluminum having a low reactivity to the ammonia gas even at high temperatures, the decomposition reaction of ammonia can be prevented. The utilization ratio of the ammonia gas can then be improved, and the formation of decomposition products such as $NO_x$ and nitrous oxide ($N_2O$) can be controlled.

That is, the following effects can be achieved by the present invention.

(1) In a high-temperature denitration apparatus in which the temperature of an exhaust gas is higher than 480° C., an ammonia gas can reach a denitration catalyst without decomposing, whereby a high utilization ratio of the ammonia gas can be obtained.

(2) The formation of $NO_x$, $N_2O$ and the like which are decomposition products of the ammonia gas can be reduced.

DETAILED DESCRIPTION OF THE PREFERRED EMBODIMENT

Figure 1:
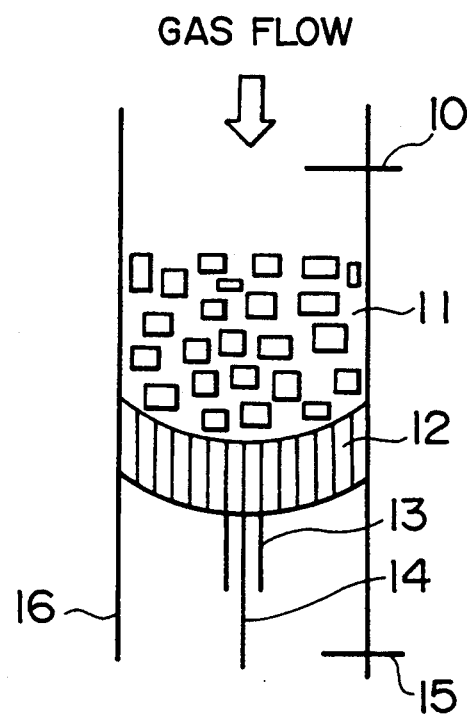
FIG. 1 is an illustrative view of an experimental setup for testing effects of the present invention.

An embodiment of the present invention will now be described in reference to FIG. 1 to elucidate the effects of the present invention. FIG. 1 shows a running type reactor for testing the embodiment.

A reaction tube 16 of the running type reactor in FIG. 1 comprises a quartz tube which does not have any influence on the decomposition and the like of a gas. In the reaction tube 16, a grating 12 having many small holes is disposed, and 5 mm×5 mm cubic test samples 11 made of various kinds of materials are arranged on the upstream side of the grating 12 in such a manner that the stream of the gas may not be obstructed. The grating 12 is provided with a thermocouple 14 for measuring a gas temperature. The thermocouple 14 is protected by a ceramic pipe 13. In this case, the grating 12 is also made of ceramics which have no influence on the decomposition and the like of the gas. The reaction tube 16 is equipped with an ammonia densitometer 10 on the upstream side of the gas stream and an $NO_x$ and ammonia densitometer 15 on the downstream side of the gas stream, so that the concentrations of ammonia and $NO_x$ in the gas can be measured at respective positions in the gas flow.

As test conditions, the gas temperature was maintained at 610° C. (by means of a heater not shown), and the gas into which ammonia had been injected so that an ammonia concentration became 1.3% was allowed to stream from an upstream side of the reaction tube 16 at a rate of 260 Nl/hr. During this step, the gas temperature was measured by the thermocouple 14, and the concentrations of ammonia and $NO_x$ in the gas were also measured by the ammonia densitometer 10 and the $NO_x$ and ammonia densitometer 15.

As test samples 11, prepared were Sample Nos. 1 and 2 for comparative examples and Sample Nos. 3 and 4 for examples of the present invention. For each test sample, an ammonia decomposition ratio and the concentration of produced $NO_x$ were measured. The 60 pieces of the test sample 11 were made in the form of a 5 mm×5 mm cube from the above-mentioned four kinds of materials, and the reaction tube 16 was then filled with the 60 pieces of the test sample 11 and measurements were made to find values of the above-mentioned variables. The results are shown in Table 1. As is apparent from Table 1, Sample No. 1 (STPA 22) and Sample No. 2 (STPA 24), which had not been subjected to the calorizing treatment, show the ammonia decomposition ratios of 24% and 22.5%, respectively. Also, the concentrations of $NO_x$ produced were 1,350 ppm for STPA 22 and 1,450 ppm for STPA 24. In the case where the samples were subjected to the calorizing treatment to aluminize the surfaces of these test samples, the decomposition ratios of the Sample No. 3 (STPA 22+the calorizing treatment) and Sample No. 4 (STPA 24+the calorizing treatment) were 4.8% and 4.1%, respectively, and it is apparent that the decomposition ratio for either sample was 5% or less. These results indicate that the calorizing treatment is effective to prevent ammonia from decomposing. Furthermore, the concentration of $NO_x$ produced with Sample No. 3 was 288 ppm, and that of $NO_x$ produced with Sample No. 4 was 236 ppm, and it is apparent that the production of $NO_x$ with Sample Nos. 3 and 4 was much smaller than with Sample Nos. 1 and 2, which are the comparative examples.

With Sample Nos. 1 and 2, the concentrations of produced $NO_x$ were not directly proportional to the ammonia decomposition ratios. This may be due to the fact that even if ammonia decomposes it does not necessarily becomes all NO$_x$, and can be attributed to some experimental errors.

In short, in the comparative examples, the ammonia decomposition ratios were in the range of from 24 to 22.5% and the concentrations of the produced NO$_x$ were in the range of from 1,350 to 1,450 ppm, whereas in the examples of the present invention, the ammonia decomposition ratios were in the range of from 4.8 to 4.1%, and the concentrations of the produced NO$_x$ were in the range of from 288 to 236 ppm. Thus, in the examples of the present invention, the decomposition of ammonia was very limited, and the concentrations of NO$_x$ produced in connection with the ammonia decomposition were also small. Consequently, it is clear that the covering layer formed by the calorizing treatment was the kind of metal which does not promote the decomposition of ammonia.

TABLE 1

| No. | Sample | Ammonia Decomposition Ratio (%) | Conc. of Produced NO$_x$ (ppm) |
| --- | --- | --- | --- |
| Comparative Example 1 | JIS* 3458 STPA22 (Cr:Mo = 1:0.5) | 24 | 1350 |
| Comparative Example 2 | JIS 3458 STPA22 (Cr:Mo = 2.25:1) | 22.5 | 1450 |
| Example 3 | JIS 3458 STPA22 + Calorizing treatment | 4.8 | 288 |
| Example 4 | JIS 3458 STPA24 + Calorizing treatment | 4.1 | 236 |

*JIS is the abbreviation for the Japanese Industrial Standard.

Figure 2:
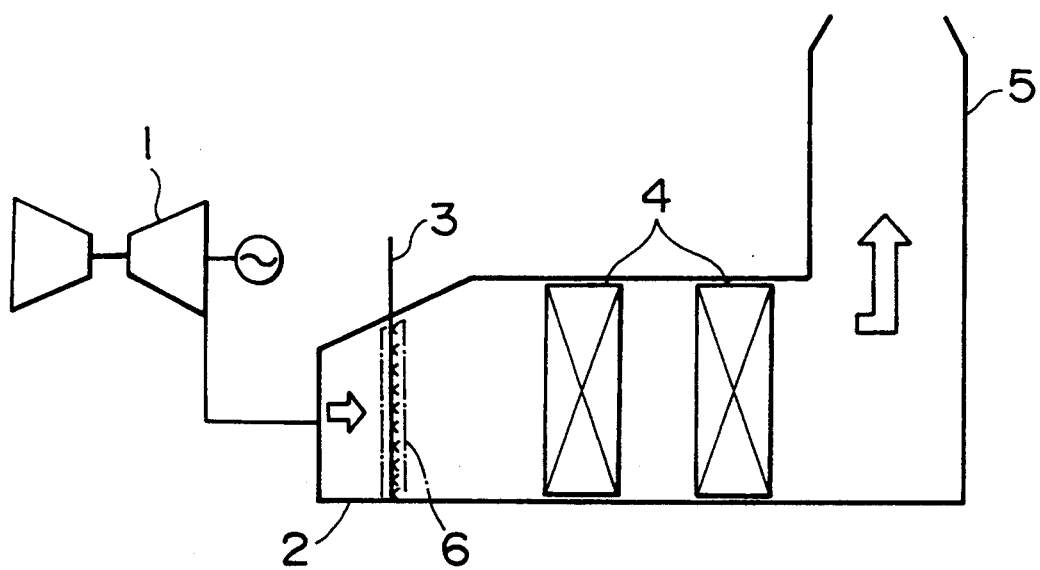
FIG. 2 is an illustrative view of an embodiment in which the present invention is applied to a high-temperature denitration apparatus for an exhaust gas coming from a gas turbine.

Next, FIG. 2 shows an embodiment of the application of the present invention to a high-temperature denitration apparatus for an exhaust gas coming from a gas turbine. The exhaust gas from the gas turbine 1 is passed through an exhaust gas duct 2, while the gas is maintained at a high temperature, and ammonia is then injected into the high-temperature atmosphere of the exhaust gas through an ammonia injection device 3. Ammonia is reacted with NO$_x$ on a high-temperature denitration catalyst 4 to be made harmless, and then discharged from the system through a chimney 5. In this case, the metal inner surface of an ammonia injection device 3 shown by a dotted line 6 in FIG. 2 is subjected to an aluminizing treatment, whereby the decomposition of ammonia can be inhibited and the denitration apparatus can be operated at a high efficiency.

In FIG. 2, the present invention may be applied to a diesel engine in place of the gas turbine 1. Furthermore, even if the aluminizing treatment is replaced with the coating of ceramics such as zirconia, the similar effect can be achieved, but in this case, there is the problem that resistance to thermal shocks is poor.

Figure 3:
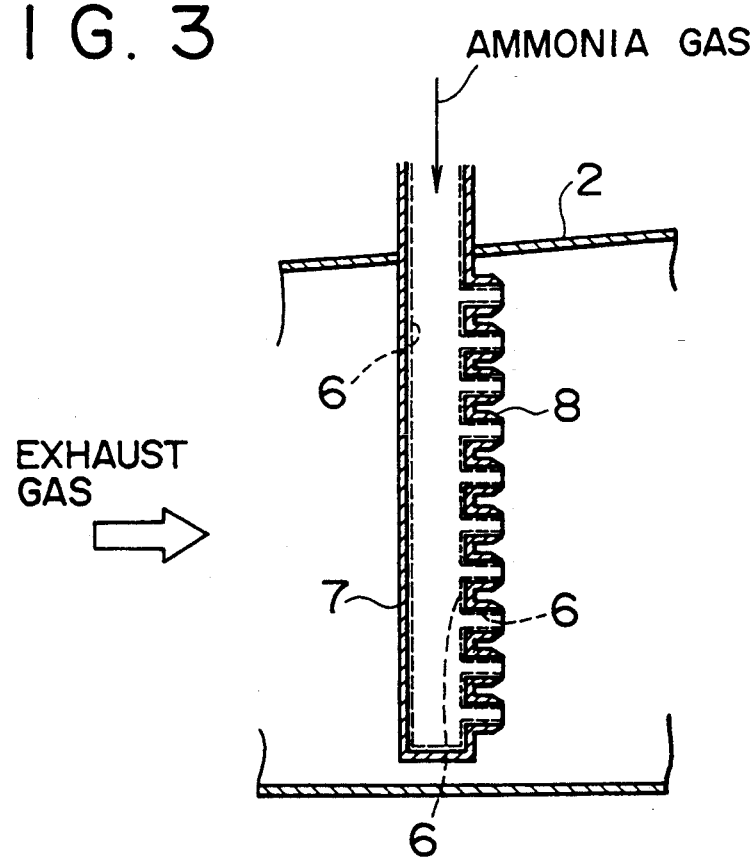
FIG. 3 is an illustrative view of an embodiment of the ammonia injection device according to the present invention.

FIG. 3 shows an embodiment of the ammonia injection device according to the present invention. In order to introduce the ammonia gas from the outside to the inside of the exhaust gas duct 2, a mother nozzle pipe 7 is provided through the wall of the exhaust gas duct 2. Many injection nozzles 8 are attached to this mother nozzle pipe 7. The inner surface of this mother nozzle pipe 7 is subjected to an aluminizing treatment 6 in the manner described above, and the inner surfaces of the injection nozzles 8 are also subjected to the aluminizing treatment 6.

Figure 4:
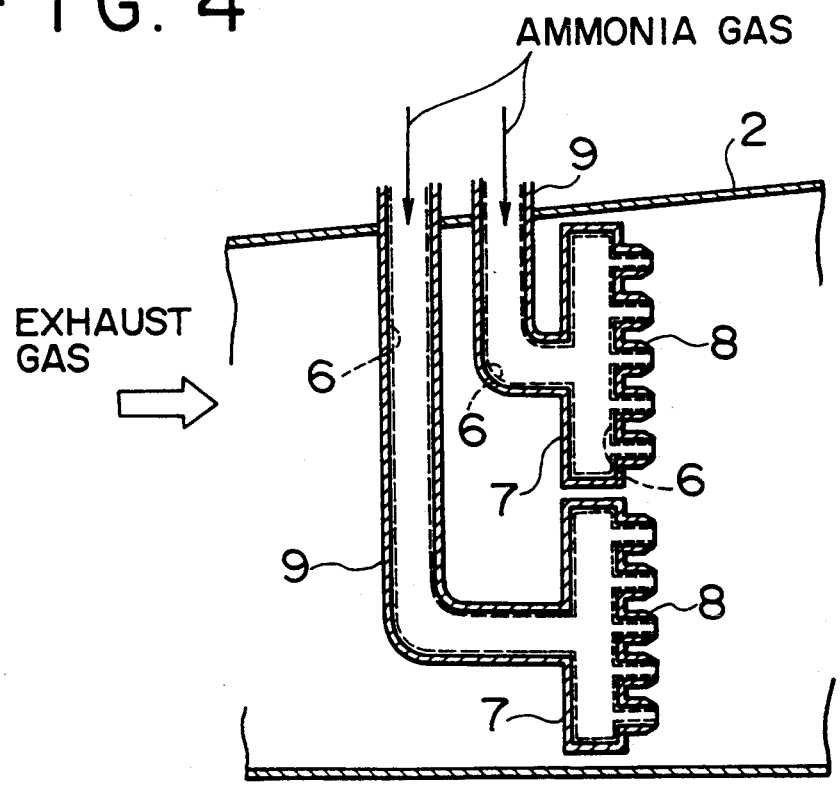
FIG. 4 is an illustrative view of another embodiment of the ammonia injection device according to the present invention.

FIG. 4 shows another embodiment of the ammonia injection device according to the present invention. For the purpose of uniformly injecting the ammonia gas, in the ammonia injection device of this embodiment, the mother nozzle pipe 7 provided with the injection nozzles 8 in the exhaust gas duct 2 is divided into a plurality of pieces. A plurality of mother injection pipes 9 are provided through the wall of the exhaust gas duct 2 from its outside, and the mother injection pipes 9 are connected to the respective mother nozzle pipes 7. The ammonia gas is injected into these mother injection pipes 9. The inner surfaces of the mother injection pipes 9 are also subjected to the aluminizing treatment 6.

That is, in the ammonia injection devices in FIGS. 3 and 4, all of the inner surfaces of ammonia injection means located within the exhaust gas duct 2 are subjected to the aluminizing treatment 6. In the thus constructed ammonia injection device, the exhaust gas from the gas turbine is passed through the exhaust gas duct 2, while the gas is maintained at a high temperature. Thus, a high-temperature atmosphere is given in the duct 2, and when the ammonia gas has reached the mother injection pipes 9 and/or the mother nozzle pipe 7, the gas is heated up to high temperatures. In this case, as shown by the dotted lines 6 in FIGS. 3 and 4, the inner surfaces of the metal portions of the ammonia injection device are subjected to the aluminizing treatment, so that the ammonia gas is prevented from coming into contact with any non-aluminized metal of the pipes, so that oxidation/decomposition of ammonia can be inhibited. Ammonia which has been injected into and mixed with the exhaust gas coming through the injection nozzles 8 reacts with NO$_x$ on the high-temperature denitration catalyst 4 arranged on the downstream side of the injection nozzles 8 to convert NO$_x$ into harmless substances. In consequence, the operation efficiency of the denitration apparatus can be improved.

What is claimed is:

1. A method for denitrating an exhaust gas which comprises the steps of:

injecting ammonia from an ammonia injection device into a high-temperature exhaust gas containing nitrogen oxide which gas is in a temperature range of 480° C. or more, wherein said injecting device is made of a material which results in the decomposition of ammonia on contact therewith and is capable of forming a metal with aluminum which does not promote the decomposition of ammonia; and then bringing a mixture of the injected ammonia and the high-temperature exhaust gas into contact with a denitration catalyst so as to reduce the nitrogen oxides;

wherein at least an inner surface of the ammonia injection device has been subjected to an aluminizing treatment, so that the ammonia is prevented from decomposing in said injection device prior to introduction of said ammonia into the mixture.

2. The method for denitrating an exhaust gas according to claim 1 wherein the ammonia injection device comprises a mother nozzle pipe and injection nozzles.

3. The method for denitrating an exhaust gas according to claim 1 wherein the ammonia injection device comprises mother injection pipes, mother nozzle pipes and injection nozzles.

4. The method of claim 1 wherein the temperature is in the range from 480° C. to 610° C.

* * * * *